Figure 1:
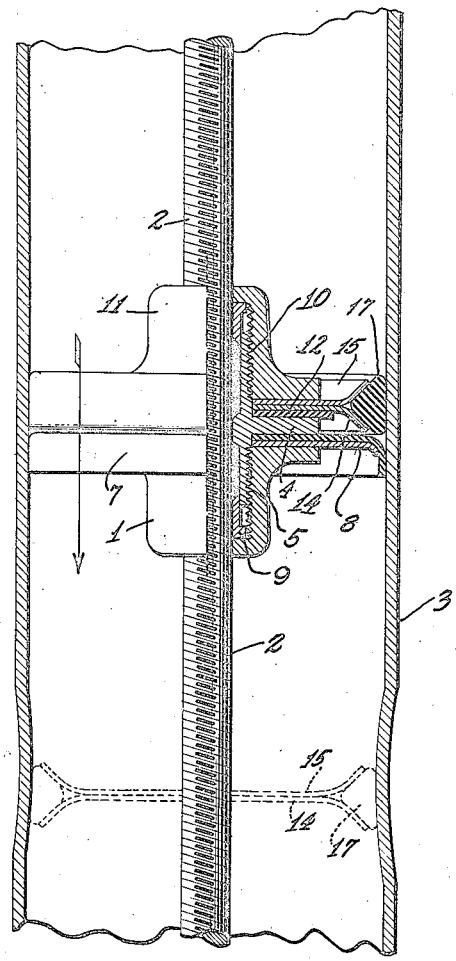

June 3, 1924.

O. G. HEYEN

PISTON PACKING

Filed Oct. 5, 1922

1,496,536

Oscar G. Heyen
INVENTOR.

BY Stewart & Perry
ATTORNEYS.

Patented June 3, 1924.

1,496,536

UNITED STATES PATENT OFFICE.

OSCAR G. HEYEN, OF BROOKLYN, NEW YORK.

PISTON PACKING.

Application filed October 5, 1922. Serial No. 592,453.

*To all whom it may concern:*

Be it known that I, OSCAR G. HEYEN, a citizen of the United States of America, and resident of Brooklyn, in the county of Kings and State of New York, have invented certain new and useful Improvements in Piston Packings, of which the following is a specification.

This invention relates to piston packing means and particularly to packing for a pump piston. The packing means of this invention may be applied to pneumatic or hydraulic pumps, in connection with the pistons of fire extinguishers or in any other environment wherein packing means of the character described would be to advantage.

The object of the invention is to provide packing means which will automatically compensate for irregularities in the diameter or wall of the cylinder in which a piston is positioned for operation without being dependent, as is the case in prior packing, upon the yielding qualities of the packing per se, but rather upon the association therewith of resilient means which tends to normally expand the packing into close conformity with the cylinder wall at all times, but is adapted to permit of contraction of such packing when an obstruction or constriction is encountered.

In one of the practical forms of the invention, I associate with the piston, preferably on its non-working side, a pair of spring discs or plates, the outer peripheries of which are beveled or flared in opposite directions to provide a V-shaped groove or channel in which relatively hard packing is positioned. The center portions of the plates or discs are clamped tightly together to force the packing into close conformity with the cylinder wall. With such a construction, the piston may be restricted within the cylinder in the usual manner and the packing will cooperate therewith to form a tight seal and preclude leakage. If the cylinder is perfectly true the discs or plates will remain unchanged with respect to one another, but if the cylinder embodies a constriction or uneven portion, the packing will, in traversing such constriction or uneven portion, be forced inwardly and in so doing will wedge the periphery of the plates apart, until the constriction is passed whereupon the plates will spring back into normal condition all the while maintaining the packing in close conformity with the cylinder wall, so that leakage will be positively precluded.

The construction is simple, economical, durable and highly efficient and may be readily dismantled when it is desired to renew the packing.

Features of the invention, other than those specified, will be apparent from the hereinafter description and claims, when read in conjunction with the accompanying drawings.

The accompanying drawings illustrate one practical embodiment of the invention, but the construction therein shown, is to be understood as illustrative, only, and not as defining the limits of the invention.

Figure 2:
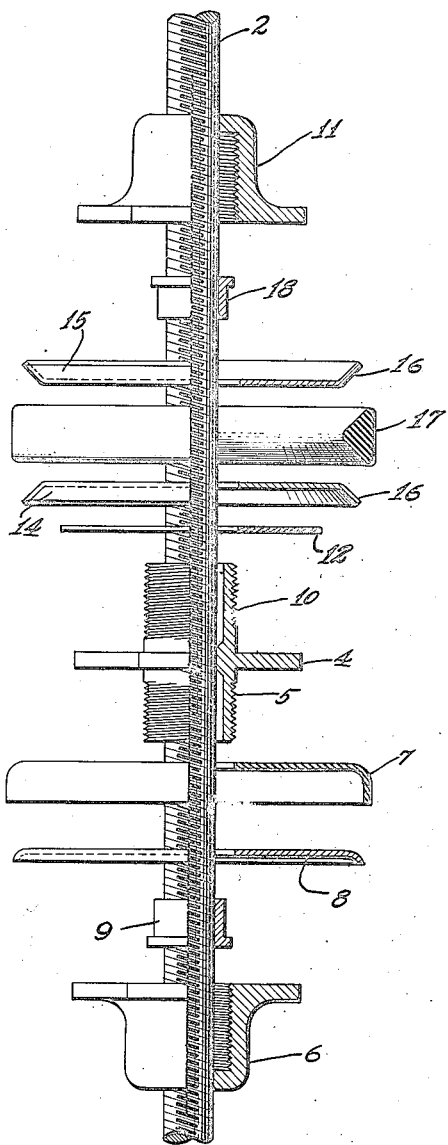

Figure 1 shows the present invention associated with a pump piston. In this figure, the piston is shown half in elevation and half in central section and a portion of the pump cylinder is shown in central section; and, Figure 2 shows all of the parts shown in Figure 1, except the pump cylinder with said parts illustrated half in section and half in elevation.

While the present invention may be associated with pump pistons intended for various uses, I have shown, in the drawings, for the purpose of illustration, the invention as associated with a pump piston of a fire extinguisher, the parts being shown as inverted as is frequently the case when the extinguisher is in use.

In the particular showing of the drawings, 1 designates the pump piston generally, 2 the piston operating stem and 3 a cylindrical part of the pump casing. The pump piston embodies a plate 4 having a threaded tubular boss 5 on which is adapted to be screwed a jamb nut 6 for the purpose of clamping a leather gasket 7 between a plate 8 and the plate 4 and to simultaneously force a plug 9 into the interior of the boss 5 to compress soft packing about the piston rod 2, so that leakage will be precluded at this point. The plate 4 has threaded connection with the piston rod 2, so that when the rod is rotated, the piston is moved longitudinally of the cylinder 3. The gasket 7 is cup-shaped as usual and forms a normal seal for precluding leakage between the piston and the cylinder wall. The foregoing description deals with the details of construction of the well known end fire extinguisher and are described here in order that the manner in which the present invention may be associated with a pump piston may be clearly understood.

In incorporating the present invention in a pump of the character described, the plate 4 is provided with a second tubular threaded boss 10 extending in an opposite direction to the boss 5 and adapted to receive a jamb nut 11. Positioned adjacent the plate 4 is a washer 12 preferably of some relatively soft material such as leather fibre or the like and adjacent the washer 12 are superimposed two discs or plates 14 and 15. These two discs are made of resilient metal and their outer margins are beveled or flared in opposite directions, as shown at 16, so that when they are brought into face abutting relation they will provide a substantially V-shaped peripheral channel or groove in which a ring or packing 17 is adapted to be positioned. The material from which the ring or packing 17 is constructed will vary with the particular use to which the piston is applied, but in fire extinguishers where chemicals must be handled, it is found advantageous to employ an asbestos packing impregated with graphite and glycerine. This makes a relatively hard packing which, prior to being assembled, is pressed into substantially the triangular cross section shown.

In assembling the parts, the washer 12, discs 14 and 15 and ring 17 are brought into tight engagement and clamped together by screwing the jamb nut 11 upon the boss 10. The same operation may be availed of to force a plug 18 into the interior of the boss 10 to compress packing and form a gland to preclude leakage. When the parts are assembled, they will appear as shown in Figure 1, wherein it will be noted that the jamb nut 11 has forced the discs 14 and 15 tightly together by maintaining them under compression while the flared portions 16 of said discs partially straddle the packing ring 17 and hold it firmly against the cylinder wall, so that it is caused to closely conform to such wall in a manner that will positively preclude leakage.

If the piston is now moved in the direction of the arrow of Figure 1, it will be obvious that any leakage between the piston and the cylinder wall will be arrested by the packing ring 17, so that the pump will function at its maximum efficiency.

The manner in which the packing means of this invention will compensate for irregularities in cylinder diameter is graphically shown in the lower portion of Figure 1, wherein, for the purpose of illustration, I have shown the cylinder 3 as provided with a pronounced constriction and in dotted lines have shown the discs 14 and 15 and the gasket 17 in the act of traversing this constriction. It will be noted from this showing that the constricted portion of the cylinder has contracted the packing ring 17 and in so doing has wedged the packing ring tightly between the flared portions 16 of said discs with the result that the discs are flexed apart to compensate for the decreased diameter of the constricted portion. If the piston moves in either one direction or the other, away from its constricted portion, the inherent resiliency of the discs will expand the ring as the diameter of the cylinder increases and in this manner the packing ring is maintained at all times in close conformity with the confines of the cylinder.

In the foregoing detailed description, I have set forth the invention in one of its practical forms and as used in conjunction with the well known form of piston. I wish it understood, however, that the invention may be associated with pistons of other kinds and that there may be cases wherein the packing ring and associated discs may be employed as a piston to the exclusion of the gasket 7 or equivalent means. However, in the preferred embodiment of the invention, my packing means is associated with an otherwise complete piston and has the function of packing the piston against leakage.

The invention, in practice, may partake of various forms depending upon the environment in which it is employed and it is to be construed as broadly novel as is commensurate with the appended claims.

Having thus fully described the invention, what I claim as new and desire to secure by Letters Patent is:

1. A packing device of the character described embodying a pair of resilient discs, the outer margins of which are flared in opposite directions to provide a peripheral channel, a packing ring seated in said channel and means for forcing the center portions of the said discs together to expand the packing ring within an associated cylinder.

2. A packing device of the character described embodying a pair of resilient discs, the outer margins of which are flared in opposite directions, a packing ring, having a triangular cross section, embracing said discs and occupying the peripheral channel formed by the flared marginal portions thereof, and means for forcing the central portions of said discs toward one another to expand the packing ring within an associated cylinder.

3. An assembly of the character described embodying a cylinder, a piston in said cylinder, a packing ring, and a pair of resilient discs for expanding the packing ring into close conformity with the cylinder wall.

4. An assembly of the character described embodyng a cylinder, a piston in said cylinder, a pair of resilient discs mounted on the piston and having their outer margins flared in opposite directions to provide a peripheral channel, a packing ring positioned in said channel, and means for forcing said discs toward one another for the purpose of placing them under tension, whereby the packing ring is expanded into close conformity with the cylinder wall.

5. An assembly of the character described embodying a cylinder, a piston in said cylinder, a pair of resilient discs having their outer margins flared in opposite directions to provide in a substantially V-shaped peripheral channel, a packing ring, having a triangular cross section, positioned within said channel, and a member mounted on the piston and cooperating with the discs to force them in a direction toward one another for the purpose of expanding the packing ring into close conformity with the cylinder wall.

6. A piston having in combination a cylindrical device composed of two flexible disks, having each a flared circumferential flange forming a groove between them, and a packing in said groove, the structure having inherent flexibility enabling it to compensate for variations in diameter of a cooperating cylinder.

7. A piston having in combination a cylindrical device composed of two flexible disks, having each a flared circumferential flange forming a groove between them, means for holding the disks rigidly together, and a packing in said groove, the structure having inherent flexibility enabling it to compensate for variations in diameter of a cooperating cylinder.

Signed by me, at New York city, N. Y., this 21 day of September, 1922.

OSCAR G. HEYEN.

Witnesses:
JOSEPH LANDSMAN,
SADIE H. OLIKER.